United States Patent [19]

Caillet

[11] 3,831,544

[45] Aug. 27, 1974

[54] WATER-TIGHT CLOSING DEVICE

[76] Inventor: René Caillet, 26 Rue de la Republique 78, Saint-Germain-En-Laye, France

[22] Filed: Aug. 3, 1971

[21] Appl. No.: 168,543

[30] Foreign Application Priority Data

Aug. 5, 1970 France .................. 70.28847

[52] U.S. Cl. .............. 114/202, 292/212, 292/256.5
[51] Int. Cl. ......................................... B63b 19/18
[58] Field of Search ............. 114/201 R, 201 A, 202, 114/203, 76; 161/189, 190; 49/234, 235, 472, 473, 474, 489, 490, 449, 450; 292/256.5, 256.73, 212, 220, 228, 304

[56] References Cited
UNITED STATES PATENTS

| | | | |
|---|---|---|---|
| 2,753,827 | 7/1956 | Sabin | 114/201 R |
| 2,930,106 | 3/1960 | Wrotnowski et al. | 161/189 X |
| 3,045,631 | 7/1962 | Stransky | 114/201 R |
| 3,120,034 | 2/1964 | Pauwels | 114/202 X |
| 3,231,460 | 1/1966 | Andrews | 161/189 |
| 3,273,743 | 9/1966 | McColl | 161/190 |
| 3,348,516 | 10/1967 | Caillet | 114/202 |
| 3,501,564 | 3/1970 | Snoeyenbos et al. | 161/190 X |
| 3,634,184 | 1/1972 | Wang | 161/190 X |

FOREIGN PATENTS OR APPLICATIONS

| | | | |
|---|---|---|---|
| 249,522 | 11/1962 | Australia | 114/203 |
| 560,511 | 10/1932 | Germany | 114/203 |
| 913,628 | 12/1962 | Great Britain | 114/203 |
| 1,208,438 | 10/1970 | Great Britain | 114/203 |

*Primary Examiner*—Milton Buchler
*Assistant Examiner*—Barry L. Kelmachter

[57] ABSTRACT

Device for automatically closing in a water-tight manner an aperture by means of a movable panel, characterized in that is comprises an inclined ramp on which the panel is caused to bear during its movement, the ramp being disposed along the longitudinal edges of the aperture so as to move away from the plane of the aperture when considering the ramp in the direction of travel of the panel during the closing movement thereof, so that during its closing movement, the panel moves towards the aperture and, at the end of this movement, eventually slides on suitable gasket means carried by the panel, along the edges of the aperture to be closed, and locking means disposed on the panel sides and adapted at the end of the closing movement to coact with corresponding locking means located externally of the aperture for automatically clamping the gaskets against the edges of the aperture.

9 Claims, 8 Drawing Figures

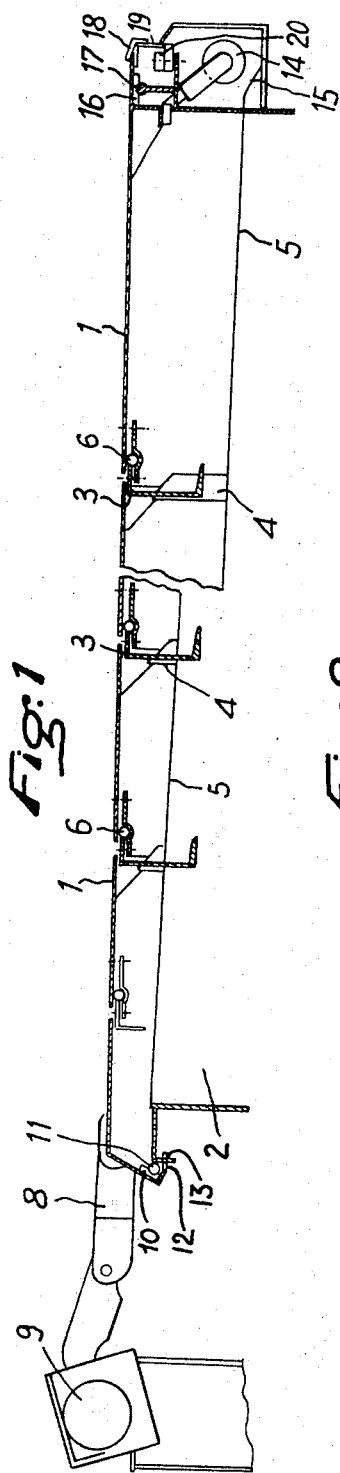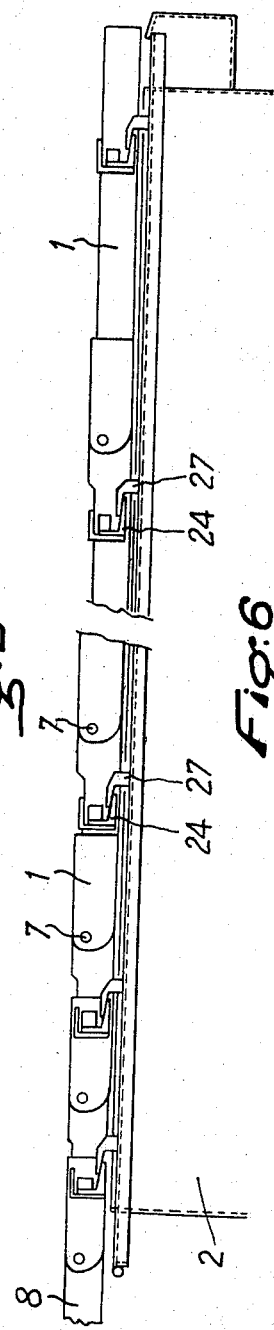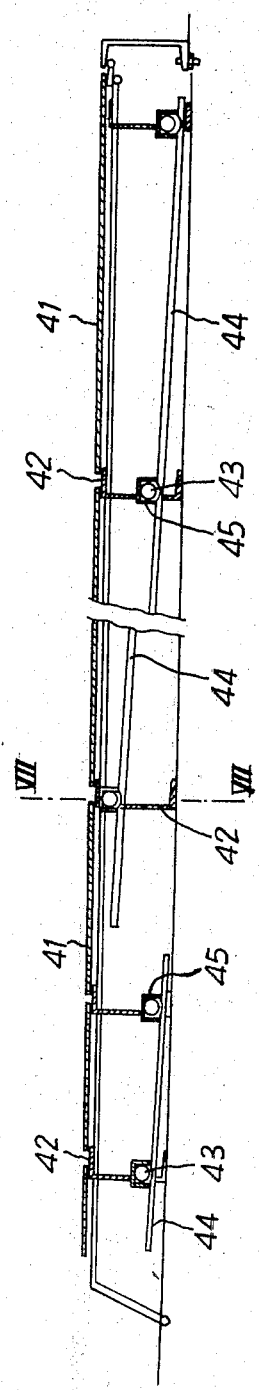

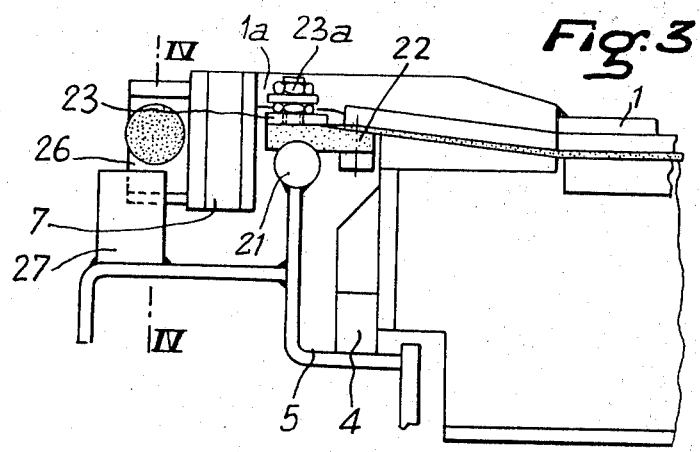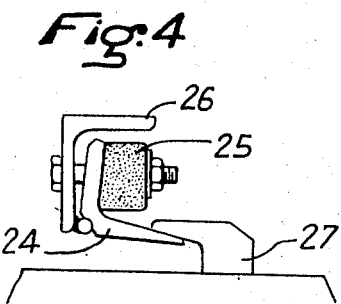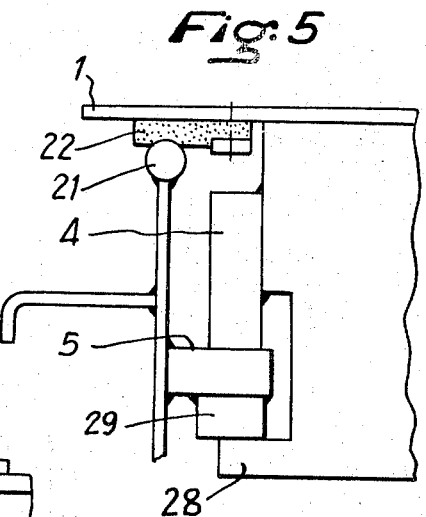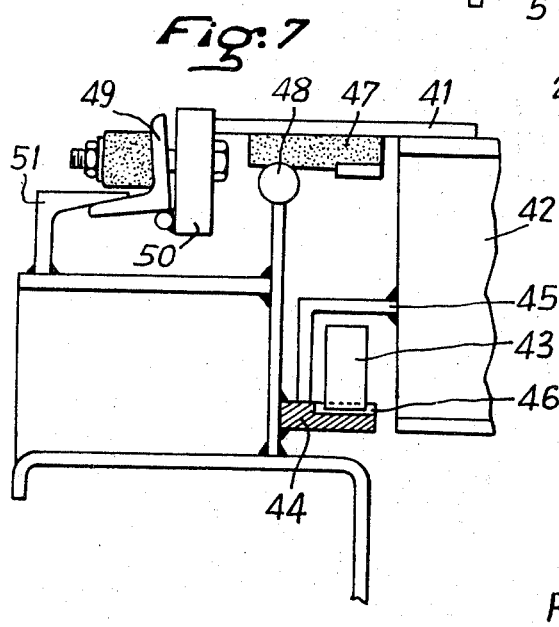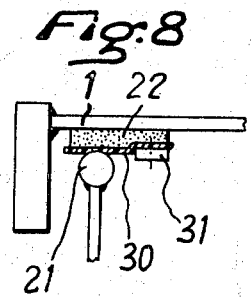

WATER-TIGHT CLOSING DEVICE

The present invention relates to a device adapted, at the end of the closing movement of a movable closing panel, to gradually press the panel against the edges of the aperture to be closed.

Closing an aperture such as a hatchway or the like by means of a hatchway panel, or a container by means of a closing panel acting at the same time as a fluid-tight cover or roofing, is accomplished in general by moving the panel in a plane parallel to the plane of the aperture proper, and then applying a transverse movement to the panel for pressing same against the edge of the aperture, a suitable elastic gasket being disposed therebetween, and finally by exerting on the panel edge a force capable of constantly clamping this panel against the edge of the aperture. Therefore, this method requires three successive and separate operations.

Certain known devices are devised for reducing to only two the number of operations necessary for closing an aperture by means of a panel of this character in a watertight manner. Thus, the U.S. Pat. No. 3,348,516 discloses a device capable of performing in a single operation the application of the panel against the edges of the aperture and the permanent tightening or clamping of the panel in this position.

It is the essential object of the present invention to provide a device applicable to all closing panels of which the movement at the end of the closing operation or at the beginning of the opening operation is substantially parallel to the plane of the aperture to be closed, whereby the water-tight closing of this aperture can be performed in a single movement taking place in a substantially uniform manner, thus permitting the use of guide and control mechanisms of particularly simple design and construction.

The device according to this invention for closing an aperture by means of a movable panel is characterized by the use of an inclined ramp on which the closing panel is adapted to travel, said ramp extending along the longitudinal edges of the aperture with the end of the inclined ramp being at a lower level in relation to the aperture plane than the level of the beginning of the ramp so as to move away from the plane of the opening when following the ramp in the direction of the closing movement of the panel, whereby the panel moves towards the aperture during its closing movement and eventually slides with the interposition of suitable sealing means or gaskets on the edges of the aperture at the end of the closing movement, and locking means being provided on the panel sides for co-acting at the end of the closing movement with corresponding locking means disposed externally and/or internally of the aperture for producing an automatic clamping of the sealing means or gaskets on the edges of the aperture.

At the end of the closing movement or at the beginning of the opening movement, the movable panel slides on the edges of the aperture to be closed through the medium of sealing means or gaskets carried by the lower face of the panel. However, to close the aperture with a satisfactory water-tightness these sealing means or gaskets should have a considerable elasticity, this implying of course a high coefficient of friction and therefore, a considerable reduction in useful life of said sealing means or gaskets thus exposed to severe wear and tear. This contradictory problem is solved by the present invention by either lining the face of the elastic material of said gaskets which is intended to co-act with the edge of the aperture with a sheet of plastic material having an extremely low coefficient of friction, such as polytetrafluoroethylene, or coating this face with a layer of a material, such as polyurethane resin, having a good resistance to abrasion and a low coefficient of friction, or alternatively by lubricating the top of the marginal portion and the gasket with a silicone-containing grease, so that the gasket material will not be impaired; a combination of these various means may also be used for the purpose of this invention. The inclination of the slideway is calculated to limit to only 1 or 2 inches the movement during which the gasket is in frictional contact with the edge of the aperture, the compression of the gasket being during this time relatively low but insuring a good sealing; this implies of course that the gasket accomodates exactly the various unevennesses of this edge. To this end, a vertical adjustment of the gasket is contemplated.

In the attached drawings

FIG. 1 is a fragmentary longitudinal section showing a first form of embodiment of the device of this invention in the case of a hatchway panel illustrated in its closed position;

FIG. 2 is an elevational view showing the panel of FIG. 1 in its closed position;

FIG. 3 is a fragmentary cross-sectional view of the device of FIGS. 1 and 2;

FIG. 4 is a section taken along the line IV—IV of FIG. 3;

FIG. 5 is a fragmentary cross-sectional view showing a modified form of embodiment of the device of this invention, with means for locking the panel in its closed position by means of its internal reinforcing structure;

FIG. 6 is a view similar to FIG. 1 showing another form of embodiment of the invention also in the case of a hatchway panel shown in its closed position;

FIG. 7 is a fragmentary section taken along the line VII—VII of FIG. 6, and

FIG. 8 is a detail view showing a typical gasket adapted to be used for carrying out this invention.

Referring first to FIG. 1, a winding-type hatchway panel consisting of a series of elements 1 is shown; this panel is adapted to close a hatchway 2 in the deck of a ship or like structure. Each element 1 comprises an upper wall (for example horizontal in the unfolded or closing position) and an internal reinforcement 3 acting through a shoe or vertical support member 4 on a slideway 5 carried by the hatchway coaming. As shown in FIG. 1, the support members are of decreasing length and are adapted to slide along the slideway, or ramp, so that the panel is maintained parallel to the plane of the aperture and that during its closing movement, the panel moves toward the aperture. The elements 1 are interconnected by intermediate hinge means 6 and lateral hinge means 7. The leading element 1 of the panel is connected through arms 8 to a winding drum 9 similar to the configuration shown in U.S. Pat. No. 3,348,516 and comprises on its inner face a rubber gasket 10 adapted to engage without sliding the transverse or end edge 11 of the hatch coaming. The panel is adapted to be locked in this position by the engagement of pins 12 into corresponding openings 13 of the hatch coaming.

The last element of this panel comprises, at the end of its lower face, a roller 14 adapted to move along the slideway 5 and to escape, at the end of the panel closing movement, from a ramp 15; thus, a longitudinal gasket 16 carried by the panel is pressed against the transverse edge 17 of the hatch coaming and the panel is consequently locked as a consequence of the engagement of its end under the studs 18 of an angle member 19 connected to the hatch coaming by means of elastic pads 20.

As illustrated in FIG. 3, the tightness of the panel along the lateral edges 21 of the coaming is obtained by using longitudinal gaskets 22 of which the vertical position is determined by flat bars 23 secured to the panel by welding or through suitable fastening means such as screws 23a permitting their vertical adjustment. However, to facilitate this adjustment, the sheet metal constituting the element 1 may be either provided with openings, or notched completely and replaced by gussets 1a. The slideways 5 along which the panel elements 1 are adapted to travel are inclined (in the panel closing direction) away from the plane of the aperture 2 to be closed so that, at the end of the panel closing movement, the gasket 22 will bear on the edge 21 of the hatch coaming and, as the panel continues its forward movement, the gasket is pressed against the edge of the hatch coaming with a gradually increasing force, until a complete and water-tight closing is obtained. During this clamping movement, the angle member sections 24 (FIGS. 3 and 4) connected through elastic pads 25 to supports 26 rigid with the panel sides engage shoes 27 secured to the hatch coaming, thus locking the panel in its closed position. The inclination of ramp 5 is so calculated that during the panel opening movement each angle member section 24 passes above the preceding shoe 27. However, in case the ramp inclination were not sufficient to permit this passage of the angle member section 24 above the preceding shoe 27, it would be possible and advantageous to either dispose alternatively angle-member sections and corresponding shoes on either side of the panel gasket, or dispose them by turns on either side of angle member sections 24, and off-set them horizontally or vertically by disposing at a lower level those located nearer to the winding drum.

In FIG. 5 there is shown a modified form of embodiment of the panel locking device, applicable notably in case of structures wherein considerable stress from within the aperture is produced, wherein the locking action is obtained by engaging projections 28 carried by the internal reinforcements of the panel elements under blocks 29 of gradually increasing height which are rigid with the lower face of slideways 5.

For a proper operation of this last-mentioned form of embodiment of the device the gasket 22 carried by the lower face of the panel elements and adapted at the end of the closing movement to slide on the edge 21 of the hatch coaming must be capable of being compressed against this edge during the clamping operation. Therefore, the gasket 22 must have a good elasticity, which entails a relatively high coefficient of friction and consequently a rapid wear and tear conducting to its ultimate and premature destruction. As a rule, the tearing resistance of the gasket increases with its elasticity.

To solve this contradictory problem there is provided according to the present invention (FIG. 8), on the working surface of gasket 22 a sheet 30 of plastic material having a very low coefficient of friction, such as polytetrafluoroethylene, which is clamped on the side by a flat or strip iron element 31. During the compression of gasket 22 the sheet 30 slides both on the edge 21 of the hatch coaming and on the gasket material without undergoing any dimensional change, which would be inconsistent with its lack of elasticity.

The surface of gasket 22 adapted to engage the edge 21 of the hatch coaming may be lined with a sheet of flexible yet moderately elastic fabric to prevent the elongation of this surface. The sheet is coated with a layer of plastic material or resin, adapted to be applied with a brush and containing, for example, polyurethane. This material has a good resistance to abrasion, a low coefficient of friction and a low elasticity. Alternatively, the top of said edge 21 and the gasket 22 could be lubricated with a grease, such as silicone grease, not liable to damage the gasket.

In FIGS. 6 and 7 a modified form of embodiment of this invention is illustrated wherein each panel element 41 carries on the side edges of its internal reinforcement 42 a plurality of rollers 43 rolling on a track 44 carried by the hatch coaming and consisting advantageously of two sections in order to accentuate its incline. Slightly recessed from each roller 43 is a roller case 45. At the end of the closing movement these rollers 43 drop into recesses 46 formed at the end of the inclined track 44 and the panel is thus caused to bear on said tracks 44 by means of the roller cases 45. The gaskets 47 of the panel are pressed as in the preceding forms of embodiment by causing an angle member 49 pivoted to a support 50 rigid with each panel element to engage a shoe 51 welded to a coaming plate. This arrangement may if desired be combined with the internal locking device of FIG. 5.

It will be readily understood by those conversant with the art that the various forms of embodiment of the invention which are shown and described herein should not be construed as limiting the scope of the invention since various modifications may be brought thereto without departing from the basic principle of the invention as set forth in the appended claims.

What I claim is:

1. Device for automatically closing in a watertight manner an aperture by means of a moveable panel, comprising a panel having a plurality of elements of different lengths, an inclined ramp, said ramp being disposed along the longitudinal edges of the aperture on a slant to the plane of said aperture when considering said ramp in the direction of travel of said panel during the closing movement thereof, each element having support members at the ends thereof, each support member on the ends of each element being of decreasing length and being adapted to slide along said ramp while maintaining said panel parallel to the plane of the aperture so that during its closing movement said panel moves towards the aperture, gasket means carried by said panel capable of sliding along the edges of the aperture to be closed at the end of said panel closing movement, locking means located externally of said aperture and further locking means being disposed on said panel sides and adapted at the end of said panel closing movement to co-act with first mentioned locking means for automatically clamping said gaskets against the edges of the aperture.

2. Device according to claim 1, wherein a projection is carried by said panel and a corresponding element of the aperture structure is positioned for receiving said projection thereunder and locking said panel.

3. Device according to claim 1 including elastic clamping means provided along a transverse edge of the aperture for receiving the end edge of the panel whereby the tail element of the panel is pressed against the transverse edge of the aperture to be closed by guide rollers carried by said panel end, and recesses formed in a track provided for said rollers whereby introduction of said panel end edge takes place automatically when said rollers engage said recesses.

4. Device according to claim 3 including second locking means carried by said panel sides consist of angle members pivoted to said sides, shoes secured to the edge of the aperture and horizontal wings of said angle members being adapted to engage said shoes.

5. Device according to claim 4, wherein said locking means are off-set in case their relatively short mutual spacing prevented the pivoted angle members from engaging the corresponding shoes.

6. Device according to claim 1, wherein said gasket means is carried by the lower face of said panel and consists of a material of relatively high elasticity, and the gasket face adapted to co-act with the edge of the aperture being lined with a material having a very low coefficient of friction and a high resistance to abrasion.

7. Device according to claim 6, wherein said gasket lining consists of a sheet of plastic material such as polytetrafluoroethylene.

8. Device according to claim 6, wherein the gasket lining consists of a layer of fabric coated with a material such as polyurethane.

9. Device according to claim 6, wherein the gasket lining is coated with a layer of grease, such as silicone grease, not liable to damage same.

* * * * *